United States Patent [19]

Appleby

[11] Patent Number: 4,610,938
[45] Date of Patent: Sep. 9, 1986

[54] ACID FUEL CELL

[75] Inventor: Anthony J. Appleby, Mountain View, Calif.

[73] Assignee: Electric Power Research Institute, Palo Alto, Calif.

[21] Appl. No.: 759,064

[22] Filed: Jul. 24, 1985

[51] Int. Cl.[4] .................... H01M 4/86; H01M 8/08
[52] U.S. Cl. ....................................... 429/42; 429/46
[58] Field of Search ................ 429/42, 43, 46, 40; 204/290 R, 294

[56] References Cited

U.S. PATENT DOCUMENTS 3,899,356  8/1975  Groult et al. .................. 429/42
4,407,906  10/1983  Stonehart ...................... 429/42
4,529,672  7/1985  Howard et al. ................ 429/42

Primary Examiner—Anthony Skapars
Attorney, Agent, or Firm—Flehr, Hohbach, Test, Albritton & Herbert

[57] ABSTRACT

An improved electrochemical fuel cell is provided wherein the catalytic surface of the electrode comprises a layer bonded thereto, such layer comprising a fluorinated acid-containing polymer. The layer allows for separation of the conductivity and catalytic functions of the electrode, resulting in improved cell performance.

8 Claims, 1 Drawing Figure

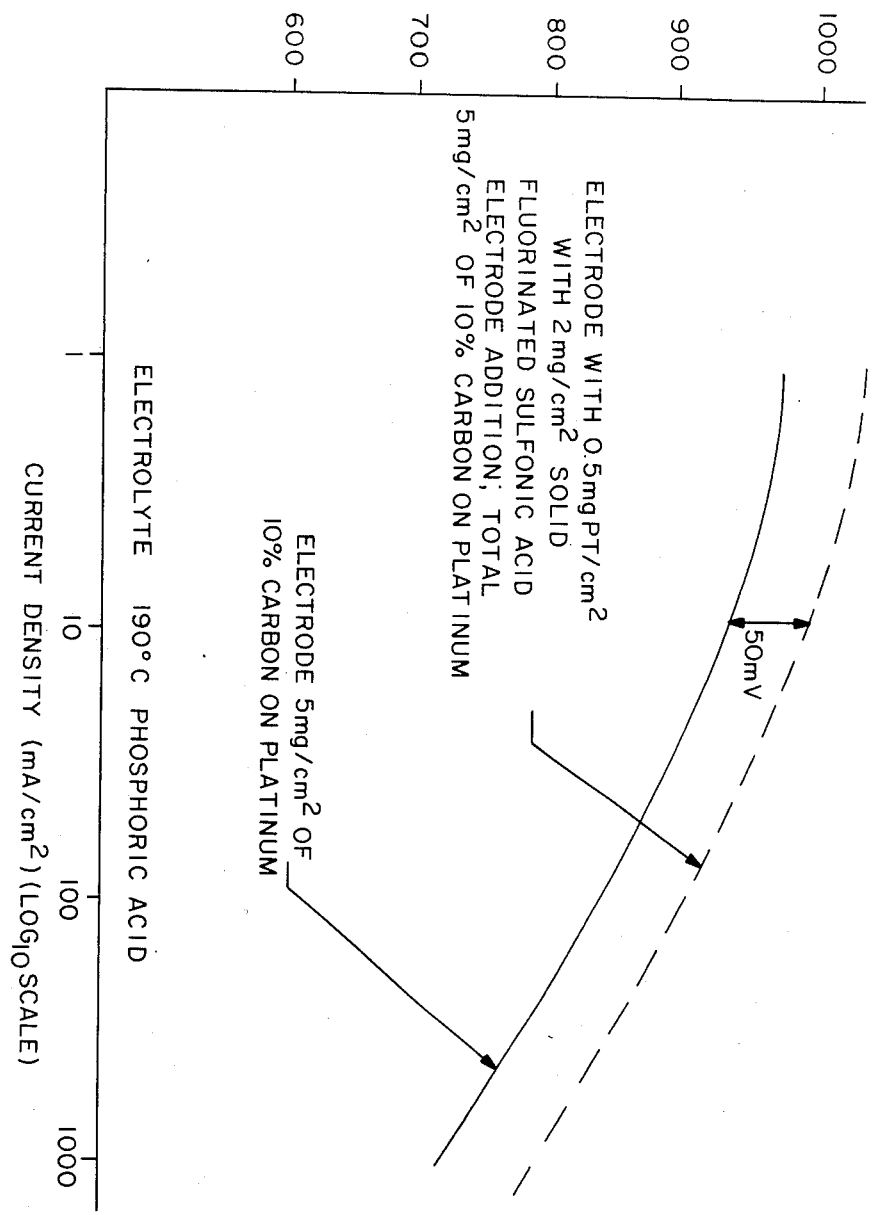

ACID FUEL CELL

The present invention is directed to improved electrochemical fuel cells. In particular, the present invention is directed to an improved electrode for the gas phase reaction in an electrochemical fuel cell utilizing an acid electrolyte.

BACKGROUND OF THE INVENTION

Electrolytic fuel cells commonly operate using a phosphoric acid electrolyte under operating conditions of close to 200° C. Phosphoric acid appears to be an ideal electrolyte since it is characterized by a low IR drop. While other acids may be stable at 200° C., such acids are not ideal. For example, the fluorinated sulfonic (or phosphonic) acids have one advantage over phosphoric acid in that the former acids are less strongly adsorbed on the platinum-metal or alloyed catalyst used for both oxygen reduction and hydrogen oxidation within the fuel cell. Furthermore, the fluorinated sulfonic (or phosphonic) acids appear to have a higher oxygen and hydrogen solubility, a consequence of which is that oxygen is reduced more efficiently and the hydrogen electrode is more tolerant to carbon monoxide and other impurities in the fuel gas stream within the cell. These characteristics of the fluorinated sulfonic (or phosphonic) acids would suggest that these acids as electrolytes would allow cell operation at higher potentials, at the same current density, compared to phosphoric acid, thus apparently providing the higher system efficiency, or alternatively higher current densities at the same potential, yielding a lower system capital cost.

However, the fluorinated sulfonic (or phosphonic) acids exist as hydrates under the conditions of a fuel cell operating at utility conditions, in which the hydronium ions are relatively immobile. Thus, this results in low conductivity, leading to high internal cell IR drop. This disadvantage virtually annuls the improved electrode performance due to the higher solubility of the gases in these acids.

Attempts to alleviate this problem with the sulfonic or phosphonic acids as electrolytes have involved combining the fluorinated sulfonic acids either in a low molecular weight form, or in the form of polymers (such as Nafion ®) with phosphoric acid. This leads to compromised properties between the two materials (the sulfonic acids and the phosphoric acid) for ionic conductivity, while approximately retaining the higher activity of the sulfonic acid as an oxygen reduction catalyst, at least for mole percentages up to about 50% phosphoric acid. However, a lowered conductivity of the mixture still does not apparently yield a major improvement in practical cell performance.

It is therefore an object of the present invention to provide an electrochemical fuel cell which, operating with phosphoric acid as the electrolyte, comprises electrodes which separate the functions of the electrolyte for gas reaction, and for ion transport, by the use of polymer perfluoro-acids.

SUMMARY OF THE INVENTION

The present invention provides improved electrochemical fuels cells comprising at least one electrode with a catalytic surface for a gas-phase reaction, in acid electrolyte, wherein a layer is bonded to the catalytic surface of the electrode, such layer comprising a fluorinated acid-containing polymer of the following formula:

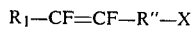

wherein X is —SO$_3$H, —PO$_3$H$_2$,

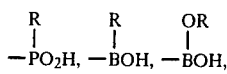

—Si(OR)$_2$OH or —CO$_2$H
wherein R and R$_1$ are independently F or perfluoroalkyl of 1 to 10 carbon atoms, and R" is (CFR$_2$)$_n$, wherein n is an integer from 0 to 10, preferably 0 to 5, and R$_2$ is F or perfluoroalkyl of 1 to 3 carbon atoms.

It will also be apparent that R, R$_1$ and R" may contain substituents which are stable to oxygen in an acid environment at temperatures up to about 200° C.

The electrode with such a layer separates the functions of the electrolyte for gas reaction and for ion transport by use of the above-identified polymers directly in contact with the catalytic sites in the electrode. Preferably, the group X will SO$_3$H, PO$_3$H or P(R)O$_2$H. In general, polymers of low equivalent weight, so that R$_1$—CF=CF—R" is of small molecular weight, are preferred.

In the accompanying FIGURE there are shown plots of oxygen electrode voltage vs. current density in a hydrogen-oxygen electrochemical fuel cell with phosphoric acid electrolyte comparing a conventional platinum/carbon electrode with an improved electrode according to the present invention.

The preferred characteristics of the electrode will be that having a surface of about 5 mg/cm$^2$ of catalytic material (preferably 10% platinum/carbon); about 1.5-2.5 mg/cm$^2$ of a perfluorohydrocarbon binding material (preferably Teflon ®); and about 1-10 mg/cm$^2$ of one of the above-identified polymers.

In a preferred embodiment, the polymer will be formed in a thin layer (preferably one micron or less) as a Teflon ®-bonded mixture directly imposed upon the catalyst surface. This will form a three-phase boundary wherein, in one phase, oxygen or other gases are solubilized in the polymer in contact with the second phase, which is the electronic conducting support (usually carbon) carrying platinum or other catalytic metal, and the third phase comprises the electrolyte containing the conducting ions. In such a system, for example, oxygen will be efficiently reduced and hydrogen efficiently oxidized, with the films of the polymer serving as gas conduits due to the gas solubilities of these materials. The ionic conductivity of such films will be minimal at 200° C., with the small thickness of the films resulting in low IR drop within the film. The catalyst-polymer layer will be in contact with the phosphoric acid in a conventional manner, so that the ionic current is carried across the cell (usually about 250 microns) by the phosphoric acid, giving low total IR drop. The polymer may be incorporated into electrodes, either prior to sintering of the Teflon ®-hydrofluoric agent since the polymer materials are stable at up to 360° C. (the Teflon ®-sintering temperature), or after sintering.

Sources of the polymers utilized according to the present invention include commercial materials such as Nafion ®, polymers based on the polymerization and oxidation of compounds such as CF$_2$=CF—S—CH$_3$, and sulfonic acid polymers prepared by radiation grafting onto a Teflon ® backbone.

Formation of the polymer layer on the electrode catalytic surface may be done by a number of conventional methods. For example, the polymer (such as Nafion ®) may be added as a fine powder to the electrode before teflonating and sintering. It may be done by adding the powder in an aqueous suspension. Alternatively, the dry powder may be added by calendaring, electrostatic spraying, silk screening, or other appropriate method. Furthermore, precursors of the polymers may be applied to the catalytic surface, preferably after sintering, followed by a cross-linking of the precursors using chemical agents, heat, irradiation or a combination thereof. For example, alcohol-soluble degraded Nafion ® may be applied to the centered electrode (prepared by autoclaving Nafion ® polymer) followed by cross-linking with by heat or radiation, which will preferentially wet the active catalyst areas of the electrode with the polymer.

Polymers having monomer units of any length may be utilized, however as stated above it is preferable that the polymer has the lowest of equivalent weight, thereby giving the highest concentration of acid groups per unit volume.

By separating the conductivity and the catalytic functions of the electrode according to the present invention, improvements in the cell performance are obtained.

The following example is provided by way of illustration, but in no way is intended to limit the scope of the invention:

EXAMPLE

A phosphoric fuel cell is operated at 190° C. using phosphoric acid as the electrolyte with a catalyst yielding 25 mA–35 mA/mg catalyst at 900 mV on one atmosphere oxygen. The oxygen electrode voltage at 1 atmosphere oxygen (as measured against hydrogen) is measured as a function of current density in the first case wherein the electrode is characterized by 0.5 mg platinum/cm$^2$. The plot is given as the solid line in the FIGURE. Then the same electrode is replaced with an electrode comprised by 5 mg platinum on carbon/cm$^2$ (10% platinum) and 4 mg/cm$^2$ of a solid fluorinated sulfonic acid polymer/Teflon ® mixture (50% Teflon ®). The fluorinated sulfonic acid is

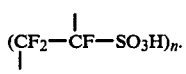

The cell was then operated under the same conditions and the performance curve is shown as the dotted curve in the accompanying FIGURE. As can be seen from the FIGURE, with the additive layer on the electrode, cell performance improved by approximately 50 mV throughout the current density range studied.

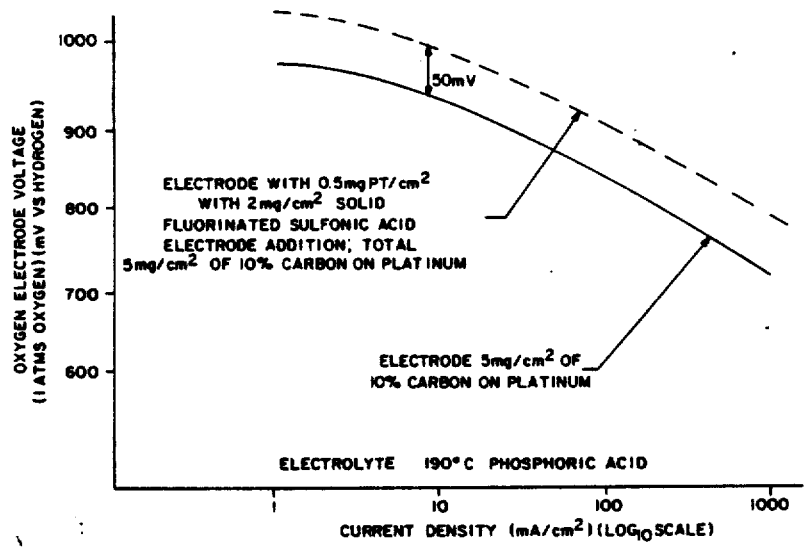

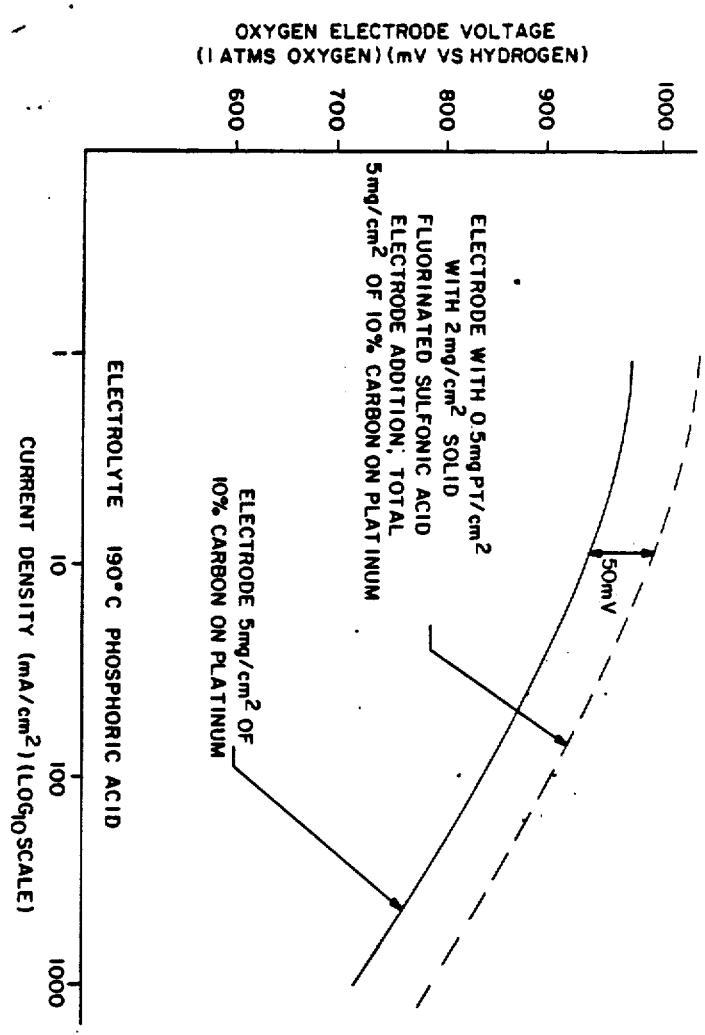

I claim:

1. In an electrochemical fuel cell comprising at least one electrode with a catalytic surface for a gas phase reaction, and an acid electrolyte, the improvement comprising a layer bounded to said catalytic surface comprising a fluorinated acid-containing polymer of the following formula:

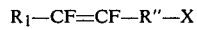

wherein X is —SO$_3$H, —PO$_3$H$_2$,

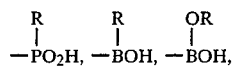

—Si(OR)$_2$OH or —CO$_2$H wherein R and R$_1$ are independently F or perfluoroalkyl of 1 to 10 carbon atoms, and R" is (CFR$_2$)$_n$, wherein n is an integer from 0 to 10, preferably 0 to 5, and R$_2$ is F or perfluoroalkyl of 1 to 3 carbon atoms.

2. A cell according to claim 1 wherein X is —SO$_3$H, —PO$_3$H or —P(R)O$_2$H.

3. A cell according to claim 2 wherein X is —SO$_3$H.

4. A cell according to claim 1 wherein said electrode is characterized by a surface of about 5 mg/cm$^2$ of 10% platinum/carbon; and said layer is characterized by about 1.5–2.5 mg/cm$^2$ of perfluorohydrocarbon binding material and about 1–10 mg/cm$^2$ of said polymer.

5. An electrode comprising a catalytic surface for gas phase reaction and a layer bonded to said surface comprising a fluorinated acid-containing polymer of the following formula:

wherein X is —SO$_3$H, —PO$_3$H$_2$,

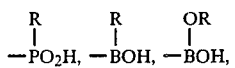

—Si(OR)$_2$OH or —CO$_2$H wherein R and R$_1$ are independently F or perfluoroalkyl of 1 to 10 carbon atoms, and R" is (CFR$_2$)$_n$, wherein n is an integer from 0 to 10, preferably 0 to 5, and R$_2$ is F or perfluoroalkyl of 1 to 3 carbon atoms.

6. An electrode according to claim 5 wherein X is —SO$_3$H, —PO$_3$H or —P(R)O$_2$H.

7. An electrode according to claim 6 wherein X is —SO$_3$H.

8. An electrode according to claim 5 characterized by a surface of about 5 mg/cm$^2$ of 10% platinum/carbon; and about 1.5–2.5 mg/cm$^2$ of perfluorohydrocarbon binding material and about 1–10 mg/cm$^2$ of said polymer.

* * * * *

UNITED STATES PATENT AND TRADEMARK OFFICE
CERTIFICATE OF CORRECTION

PATENT NO. : 4,610,938

DATED : September 9, 1986

INVENTOR(S) : Anthony J. Appleby

It is certified that error appears in the above—identified patent and that said Letters Patent is hereby corrected as shown below:

The title page should be deleted to appear as per attached title page.

The sheet of Drawing consisting of the Figure should be deleted to appear as per attached sheet.

Signed and Sealed this

Seventh Day of April, 1987

Attest:

DONALD J. QUIGG

Attesting Officer

Commissioner of Patents and Trademarks

United States Patent [19]
Appleby

[11] Patent Number: 4,610,938
[45] Date of Patent: Sep. 9, 1986

[54] ACID FUEL CELL

[75] Inventor: Anthony J. Appleby, Mountain View, Calif.

[73] Assignee: Electric Power Research Institute, Palo Alto, Calif.

[21] Appl. No.: 759,064

[22] Filed: Jul. 24, 1985

[51] Int. Cl.⁴ .................... H01M 4/86; H01M 8/08
[52] U.S. Cl. ................................. 429/42; 429/46
[58] Field of Search ............. 429/42, 43, 46, 40; 204/290 R, 294

[56] References Cited

U.S. PATENT DOCUMENTS

| 3,899,356 | 8/1975 | Grouit et al. | 429/42 |
| 4,407,906 | 10/1983 | Stonehart | 429/42 |
| 4,529,672 | 7/1985 | Howard et al. | 429/42 |

Primary Examiner—Anthony Skapars
Attorney, Agent, or Firm—Flehr, Hohbach, Test, Albritton & Herbert

[57] ABSTRACT

An improved electrochemical fuel cell is provided wherein the catalytic surface of the electrode comprises a layer bonded thereto, such layer comprising a fluorinated acid-containing polymer. The layer allows for separation of the conductivity and catalytic functions of the electrode, resulting in improved cell performance.

8 Claims, 1 Drawing Figure